US009894880B2

(12) United States Patent
Lander

(10) Patent No.: US 9,894,880 B2
(45) Date of Patent: Feb. 20, 2018

(54) HOOF BOOT WITH PIVOTING HEEL CAPTIVATOR

(76) Inventor: Kirt Lander, Kingman, AZ (US)

( * ) Notice: Subject to any disclaimer, the term of this patent is extended or adjusted under 35 U.S.C. 154(b) by 1576 days.

(21) Appl. No.: 12/882,192

(22) Filed: Sep. 14, 2010

(65) Prior Publication Data

US 2011/0000173 A1    Jan. 6, 2011

Related U.S. Application Data

(63) Continuation-in-part of application No. 11/516,914, filed on Sep. 6, 2006, now Pat. No. 9,363,980.

(60) Provisional application No. 61/242,789, filed on Sep. 15, 2009, provisional application No. 61/379,693, filed on Sep. 2, 2010, provisional application No. 60/716,013, filed on Sep. 9, 2005, provisional application No. 60/762,070, filed on Jan. 25, 2006, provisional application No. 60/824,651, filed on Sep. 6, 2006.

(51) Int. Cl.
*A01L 3/04* (2006.01)
*B68C 5/00* (2006.01)
*A01K 13/00* (2006.01)

(52) U.S. Cl.
CPC .............. *A01K 13/007* (2013.01); *A01L 3/04* (2013.01); *B68C 5/00* (2013.01)

(58) Field of Classification Search
CPC ............ A01K 13/007; A01L 3/04; B68C 5/00
USPC ................................ 54/82; 36/111; 168/18, 1
See application file for complete search history.

(56) References Cited

U.S. PATENT DOCUMENTS

| 115,311 | A | * | 5/1871 | Halsey ............................ 168/18 |
| 420,208 | A | * | 1/1890 | McKay ........................... 168/18 |
| 538,685 | A | * | 5/1895 | Larsen .............................. 54/82 |
| 591,510 | A | * | 10/1897 | Thurlow ........................... 54/82 |
| 752,090 | A | * | 2/1904 | Miller ............................. 168/18 |
| 830,403 | A | * | 9/1906 | Barclay ........................... 168/13 |
| 1,094,474 | A | * | 4/1914 | Reece ............................... 168/1 |
| 1,135,657 | A | * | 4/1915 | Brenner ............................ 168/1 |
| 1,395,689 | A | * | 11/1921 | McKenzie ........................ 54/82 |
| 4,744,422 | A | * | 5/1988 | Dallmer .......................... 168/18 |
| 6,694,713 | B1 | | 2/2004 | MacDonald |
| 7,032,367 | B1 | | 4/2006 | Yoho |
| 7,185,612 | B2 | * | 3/2007 | Faulk ............................ 119/850 |
| 2001/0056251 | A1 | * | 12/2001 | Peters ............................ 602/27 |
| 2005/0066632 | A1 | * | 3/2005 | Ford et al. ......................... 54/82 |
| 2005/0096576 | A1 | * | 5/2005 | Castro ............................ 602/27 |
| 2006/0064950 | A1 | * | 3/2006 | Ford et al. ......................... 54/82 |
| 2006/0162296 | A1 | | 7/2006 | Maestrini |

\* cited by examiner

*Primary Examiner* — Son T Nguyen
(74) *Attorney, Agent, or Firm* — Venjuris, P.C.

(57) ABSTRACT

A hoof boot has a base, a heel captivator, and a pivoting mechanism that disposes the heel captivator to pivot relative to the base, preferably in a manner that allows the heel captivator at least three degrees of freedom of movement relative to the base. The heel captivator is preferably low in the rearmost portion, which provides clearance for the pastern bones of the equine lower leg to descend upon weight bearing during movement at various gaits. To reduce the possibility for bruising and chaffing of soft tissue around the pastern bones, and to help eliminate accumulation of debris, preferred heel captivators have an open mesh architecture. Heel captivators can alternatively or additionally be designed with fabric covered neoprene or other liners. Boots are preferably tightened using mechanically advantages laces.

6 Claims, 13 Drawing Sheets

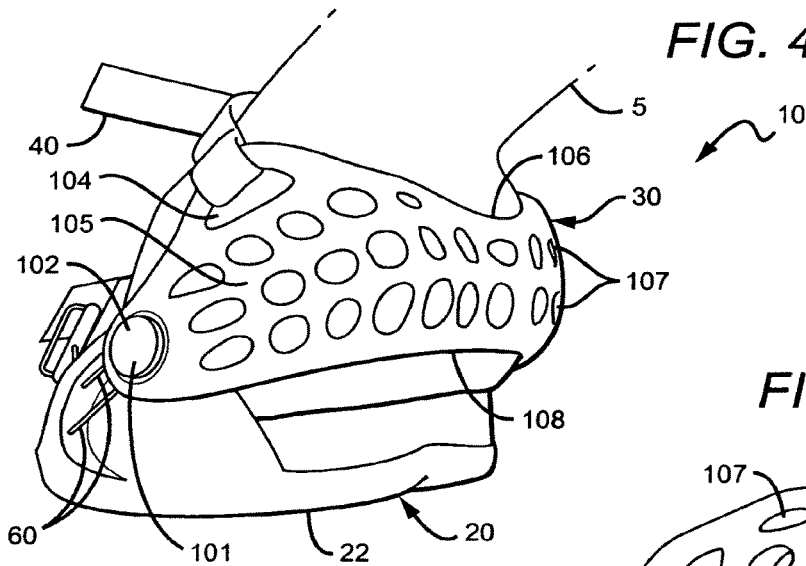
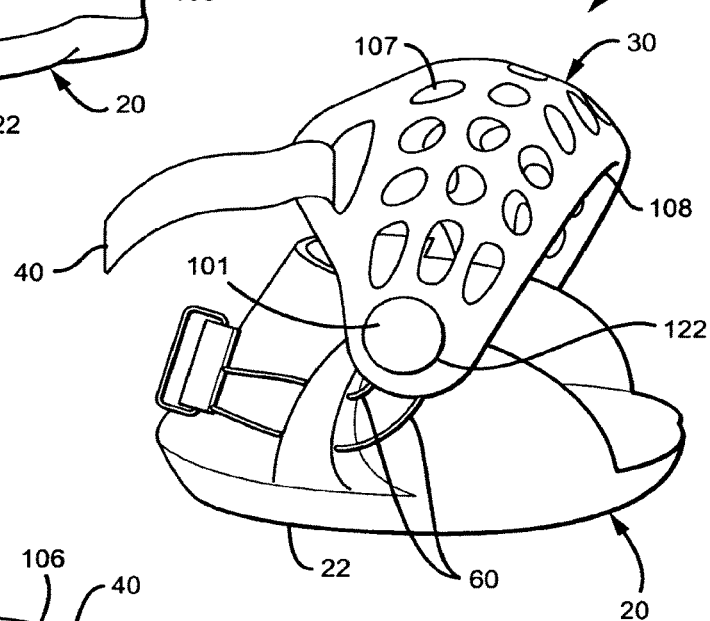
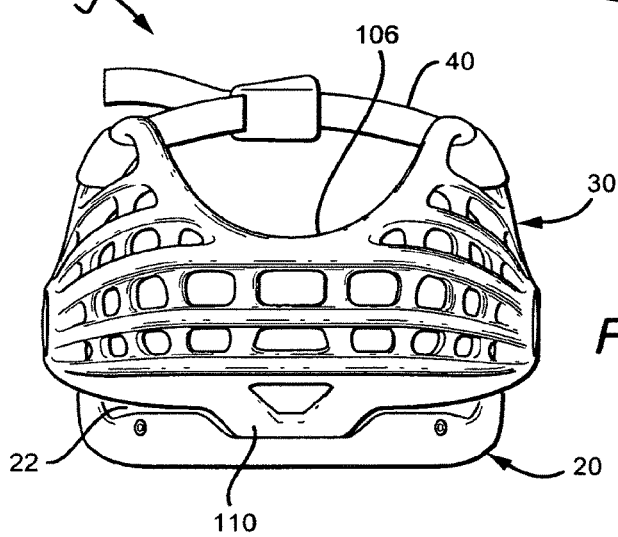

HOOF BOOT WITH PIVOTING HEEL CAPTIVATOR

This application claims the benefit of U.S. provisional application Nos. 61/242,789 filed Sep. 15, 2009 and 61/379,693 filed Sep. 2, 2010 and is a continuation-in-part of U.S. application Ser. No. 11/516,914, filed Sep. 6, 2006, which claims the benefit of U.S. provisional application Nos. 60/716,013 filed Sep. 9, 2005, 60/762,070 filed Jan. 24, 2006, and 60/824,651 filed Sep. 6, 2006 all of which applications are incorporated herein by reference in their entireties.

FIELD OF THE INVENTION

The field of the invention is equine footwear.

BACKGROUND OF THE INVENTION

For centuries, humans have been nailing horseshoes to horses' feet as the most popular solution to protecting their hooves. But horseshoes are a very poor solution. Not only can a horseshoe constrict the natural growth of the hoof, but it can also restrict the natural expansion and conformance capability of the hoof during movement. This can reduce the hoof's ability to absorb shock, which can lead to injury of the delicate soft tissues and joints of the hoof and lower leg. The constricting effect of a horseshoe can cause contraction of the heel, which can lead to heel pain, severe lameness, and even loss of use. Further adverse effects include a lack of frog pressure and support necessary for proper circulation of blood.

In recent years many horse owners are favoring the more natural approach of having their horses go barefoot. Unfortunately, this can be also damaging to the hooves. Wild horses are able to keep their feet in good condition by being on the move constantly, but domestic horses tend to require ancillary protection for their hooves. Among other things they are not able to toughen their hooves within the confines of domestication, and often encounter hazardous and unnatural footing conditions when being ridden.

One solution is to have the horse wear hoof boots. Two examples in the patent literature are discussed in U.S. Pat. No. 5,661,958 (to Glass) and U.S. Design No. D440,363 (to Ford). These patents, along with all other referenced extrinsic materials, are incorporated herein by reference in their entirety. Where a definition or use of a term in an incorporated reference is inconsistent or contrary to the definition of that term provided herein, the definition of that term provided herein applies and the definition of that term in the reference does not apply.

Unfortunately, the known hoof boots tend to have poor conformation to different hooves, and tend to fall off the hooves upon extreme movements. For example, in the '958 and '363 designs, the boots retain the heel in place by gripping the very lowest portion of the heels with a strap, and using gripper teeth to bite into the hoof wall. The gripping and the grabbing, especially by the gripper teeth, can cause significant hoof wall damage. Also, this retention method only works on horses that have shoes nailed in place, or for barefoot horses where the hooves are foamed or glued into place. There is yet another problem in that the rigidity of the boot and its closed design tends to trap debris between the boot and the hoof during use. Once dirt and mud get inside a hoof, they can cause painful bruises on the sole of the foot. Thus, boots according to the '958 or '363 patents must be properly fitted, and must be frequently checked for debris.

U.S. Application No. 2004/0168813 (to Ford), 2005/0150197 (to Ford) and 2005/0166556 (to Ford) depict improved hoof boots that wear like a sneaker. Unfortunately, such boots provide insufficient pastern clearance. An additional problem is that the lace tension mechanism puts pressure right on the coronary band (horn to soft tissue juncture) which can damage the newly grown fresh hoof horn or the delicate coronary band itself. Still further, the '197 and '556 designs have not solved the problem of trapping debris, which as mentioned above, can damage the hooves.

Ford attempted to solve the problem of trapping debris by using a "gaiter," see publication 2005/0066632. But in actual usage such gaiters can actually collect debris and exacerbate the problem.

U.S. Pat. No. 4,744,422 (to Dallmer) provides a hoof boot with mountable belts. While the belts of this design are less rigid than an enclosed boot, they still do not provide adequate flexibility, and at the same time securely retain the hoof. In addition, the '422 design has insufficient clearance for the descending pastern bones, and is open on the bottom, thereby providing little protection to the sole of the horse's hoof.

Thus, there is a need for a hoof boot that provides better conformance, retention of the hoof, and reduces entrapment of debris.

SUMMARY OF THE INVENTION

The present invention provides apparatus, systems and methods in which a hoof boot includes a base, a heel retention piece ("heel captivator"), and a mechanism that moveably couples the heel captivator to the base.

The base and other components of the boot can be made of any suitable substance or substances. Polymers are currently preferred, with the heel captivator being formed into a mesh with a plurality of holes. A liner underlying the heel captivator can be used to give extra protection. The sole of the boot preferably has a height of no more than 9 cm from the top of the sole.

The heel retention piece can be coupled to the base in any suitable manner. Preferred coupling mechanisms provide sufficient play to provide for freestanding up/down, and forward/rearward displacement of the heel captivator of at least 1.2 cm. An especially preferred coupling mechanism is a mechanically advantaged lacing system, with hook and loop fasteners. The lace preferably extends through a channel, and the pivoting mechanism comprises a restriction point where the lace exits from the channel. Such mechanisms are especially advantageously in that they allow the heel captivator at least three degrees of freedom of movement relative to the base.

The base of the boot can include a sole with a top, and pivoting mechanism is preferably disposed at a restriction point within 2 cm from the top of the sole. In many cases the restriction point is also at least 4-6 cm rearward from the front of the base. In other aspects, the base can include a front and a back and the pivoting mechanism can have a restriction point disposed rearward at least 50% of the distance between the front and the back. In still other aspects, the pivoting mechanism (which could be a hinge pin) can advantageously have a pivot or other restriction point within 2 or 3 cm of the back of the base. By moving the pin hinge forward toward the cable guides, the action of the pin hinged heel captivator will improve in a manner more in line with the non hinged version. As an extreme example, if the pin hinge were in perfect aft alignment, then the action of the heel captivator would be identical to the non-hinge pin version insofar as its ability to move with the foot. There is a sweet spot in this regard whereby a balance between movement, restriction and retention is achieved.

Tightening mechanisms are preferably mechanically advantaged in some manner, and can also include a ratchet. A tongue can advantageously underlie the tightening mechanism.

Various objects, features, aspects and advantages of the present invention will become more apparent from the following detailed description of preferred embodiments of the invention, along with the accompanying drawings, drawn substantially to scale, in which like numerals represent like components.

BRIEF DESCRIPTION OF THE DRAWINGS

FIG. 4 is an implementation of the hoof boot of FIG. 1.

FIG. 5 is a side perspective of the hoof boot of FIG. 1, with the heel captivator in an up position.

FIG. 6 is a back view of the hoof boot of FIG. 1, identifying a hinge that attaches the heel captivator to the base.

DESCRIPTION OF PREFERRED EMBODIMENTS

Figure 1:
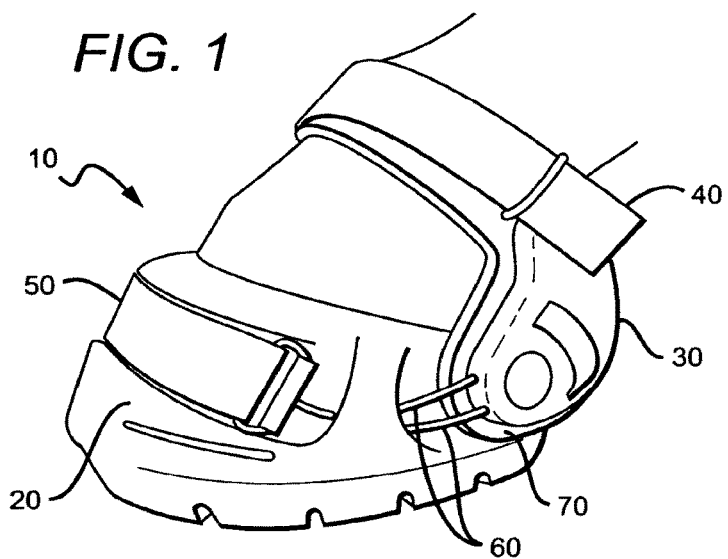
FIG. 1 is a side perspective of a hoof boot, fitted to a model of a hoof.

In FIG. 1, a hoof boot 10 generally comprises a base 20, a heel captivator 30, a keeper strap 40, a hook strap 50 with cables 60, and a liner 70.

Figure 2:
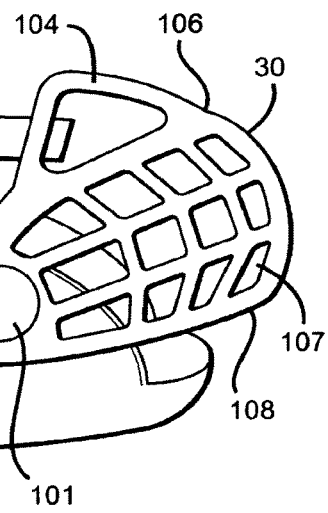
FIG. 2 is another side perspective of the hoof boot of FIG. 1.
Figure 3:
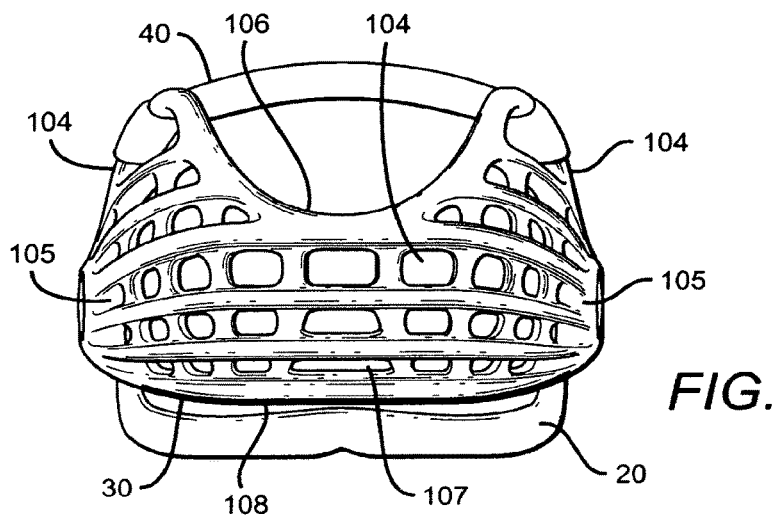
FIG. 3 is a back view of the hoof boot of FIG. 1.

As shown in FIGS. 2 and 3, a heel captivator 30 can comprise a single, contoured piece with an arch top 106, a strap holder portion 104 extending from a heel bulb 105 on each side of the heel captivator 30, an attachment position 101 on each side also extending from the heel bulb 105, and an edge 108. The strap holder portions 104 and the attachment positions 101 extending from a heel bulb 105 on each side of the heel captivator 30.

The arch top 106 extends from one of the strap holder portions 104 to the other as seen in FIGS. 2 and 3. Preferably, the arch top 106 has a U-shape or other conformation that provides adequate clearance for the pastern bone region of the hoof as shown in FIG. 4. As discussed above, the pastern bones descend very low upon the weight bearing phase of a horse and can approach ground parallel angles or lower angles near or below ground surface, especially during elevated or faster gaits such as the extended trot, canter or gallop. The arch top 106 is advantageously contoured to the soft tissue of the pastern bones to allow for ample clearance of the pastern bones to descend, without impacting the bones and tendons, or abrading the soft tissue and lateral cartilages of the lower leg. Another advantage of the arch top 106 design in FIG. 4 is that it provides adequate closure and retention of the heel of the hoof within the boot.

Extending from the arch top 106 to the edge 108, the heel captivator has two heel bulb portions 105, one located on each side. In preferred embodiments, the heel bulb portions 105 are of a concave design that contours to the hoof of the horse, a cupped heel captivator. Of course, hoof boots for animals other than horses, could require different contours, and all such contours are contemplated since the present inventive subject matter contemplates applications to other hoofed animals, including especially mules and other equine animals.

Unlike the toe region of a hoof, the heel region comprises delicate soft tissue, tendons, cartilage structures, which encompass the majority of the heel and the lower leg. Conformability of the hoof boot in the heel region is important to reduce pressure points on the soft tissue, tendons, and lateral cartilages and will minimize the potential for bruising, chaffing, and abrasion of the hoof capsule. By contouring to the shape of the heel bulb, the heel bulb portions 105 advantageously provide conformable flexibility and comfort to the heel and retain the heel in the boot and can withstand tremendous forces that are applied to the heel inside the boot.

A strap holder portion 104 is located on either side of the heel captivator 30. The design of the heel captivator is an open mesh architecture. Preferably, instead of a closed continuous piece, the heel captivator 30 comprises different sized holes 107 throughout the piece. It is contemplated that the holes 107 are of an oval shape that average 1.5 cm×1.0 cm. Other shapes, such as rectangular, triangular or any irregular shapes are also contemplated. Similarly, the size of the holes can vary from small 0.1 cm diameter circles 5 cm diameter circles. The strap holder portions 104 are essentially two large holes that can accommodate a keeper strap 40. They look like ears of the heel captivator. The advantages of the open mesh design allows for the escape of dirt and debris from the hoof. Enclosing or encasing the hoof inside of a closed boot can trap debris such as sand, rocks, dirt, gravel, water, mud, and snow, between the boot and the hoof during use. When debris is left in place for any length of time, damages ranging from bruising, chaffing, and abrasion can occur. This is especially problematic at the heel portion of the hoof as there is considerable soft tissue in this region. Thus, the open mesh design allows the debris to fall out of the boot instead of being trapped.

As shown in FIGS. 4 and 5, the edge 108 of the heel captivator is a straight edge that contours to the body of the heel captivator 30. In preferred embodiments, the edge 108 is open and disconnected to the bottom 22 of the base 20 of the heel captivator 30. The open nature of this interface between the heel captivator and the base further allow the ejection of debris. Those skilled in the art will appreciate that there is no attachment in the rearmost portion of the boot. The lack of attachment in the back of the boot allows the heel captivator to follow with the hoof and interface with the hoof in an intimate and well conforming manner minimizing concentrated pressure. This not only serves to minimize bruising and chaffing but serves to maximize the holding and restraining capability of the heel captivator. As shown in FIG. 5, the hoof (not shown) in the boot 10 can pull out of the boot in an upward, outward, and downward manner without having uneven or concentrated pressure applied to heel captivator 20 as it interacts with and attempts to restrain the caudal portion of the hoof.

Figure 7:
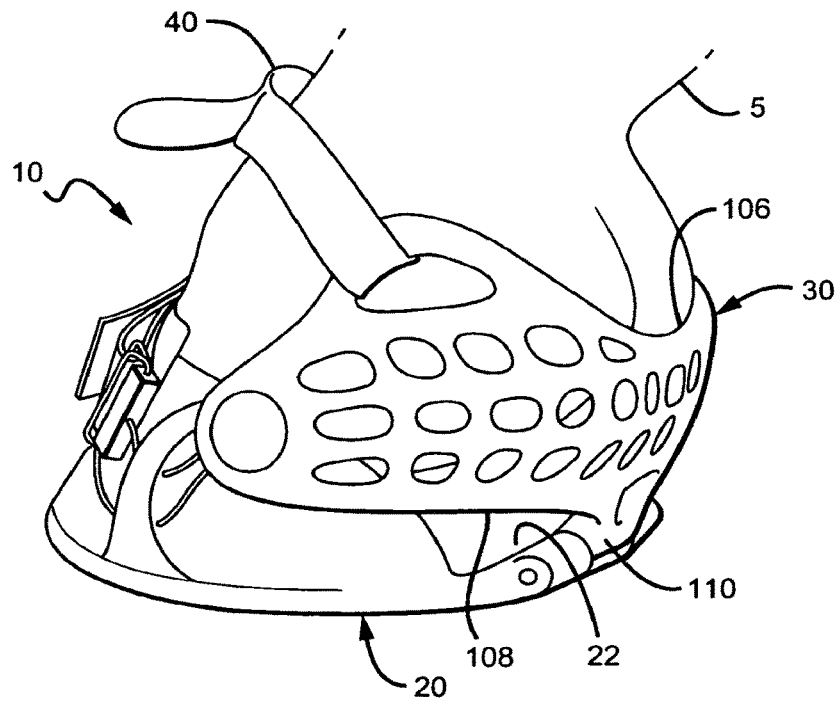
FIG. 7 is a side view of the hoof boot of FIG. 1, identifying a rearmost attachment point between the heel captivator and the base.

In an alternative embodiment shown in FIGS. 6 and 7, the heel captivator 30 is attached to the bottom 22 of the base 20 via a hinge 110. The hinge 110 rests in the center section of the edge 108 and is connected by inserting a steel rod (not shown) to an edge of the bottom 22. The hinge 110 is then pushed into the bottom 22 and the steel rod goes through both the bottom 22 and the hinge 110 to form a secure connection. The hinge action allows for flexibility of the heel captivator and permits the boot top to open wide making installation and removal of the boot much easier.

Horses can wear hoof boots with a hinged heel captivator in extreme conditions, such as trotting through heavy mud, deep snow, or other rough terrain, when the hooves need greater retention. In deep mud, for example, the vacuum or sucking action of the mud causes extreme force to act upon the boot which allows for undesirable movement of the boot in its normal relationship with the hoof. In prior art boots, such forces can easily cause the boot to either come off partially or entirely.

But where the heel captivator is hinged to the base of the boot, the hoof must stay inside the boot. Even if the horse is trying to pull itself free from the boot, or for some other reason there is extreme erratic movement of the horse, or interference from the opposing hooves, the heel captivator with the hinge is free to move along with the hoof.

In both hinged and non-hinged embodiments of the present invention, the action of the boot can automatically adjust, and the boot base can automatically tighten, thereby increasing the holding and restraining power of the heel captivator creating a near impossibility of the boot inadvertently departing from the hoof.

Figure 17:
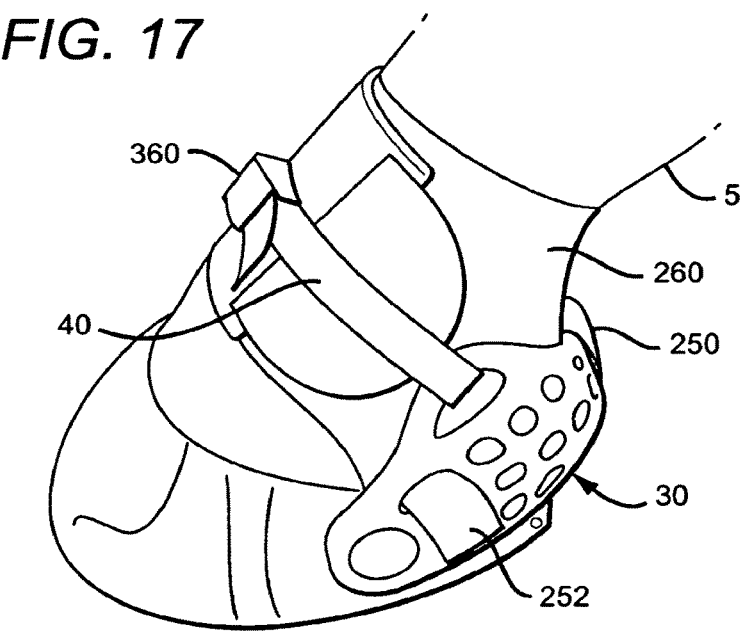
FIG. 17 is a perspective view of a hoof boot with an alternative liner.

In another alternative embodiment (see FIG. 17), the hinged version of the boot is combined with a full pastern wrap heel liner and a keeper strap or pastern strap, to provide for even better foot and/or boot retention. This version is especially good at retaining the foot when the inside of the boot gets slippery, as in the case of use in deep mud or snow. With the use of the hinge and a pastern wrap, the heel inside the heel captivator is even more restricted than with an unhinged version.

A liner inside of the hinged boot can further prevent abrasion from the hoof moving relative to the heel captivator, in the same manner that a sock can help prevent the heel of a human from rubbing on the back of the heel part of a boot or shoe.

It should be appreciated that heel captivators as discussed herein can be designed to automatically adjust to the heel height of the hoof, which can vary from animal to animal. In addition, heel captivators can be shaped in a manner that provides intimate contact with the compound and bulbous contours of the caudal region of the hoof. Still further, heel captivators can be constructed of sufficiently flexible, pliable and conforming materials to further maximize the intimate contact, and reduce the possibility of concentrated pressure caused by variances in the contours of various hooves. Currently preferred embodiments include a one-piece molding from urethane, rubber or other elastomeric material, or a singular or composite of materials such as urethane, leather, rubber, vinyl, plastic, flexible plastic sheet, sponge neoprene sheet, heavy fabric or canvas, various cords, straps and or other textile materials. All of this minimizes or at least reduces the possibility of chafing and bruising.

Figure 8A:
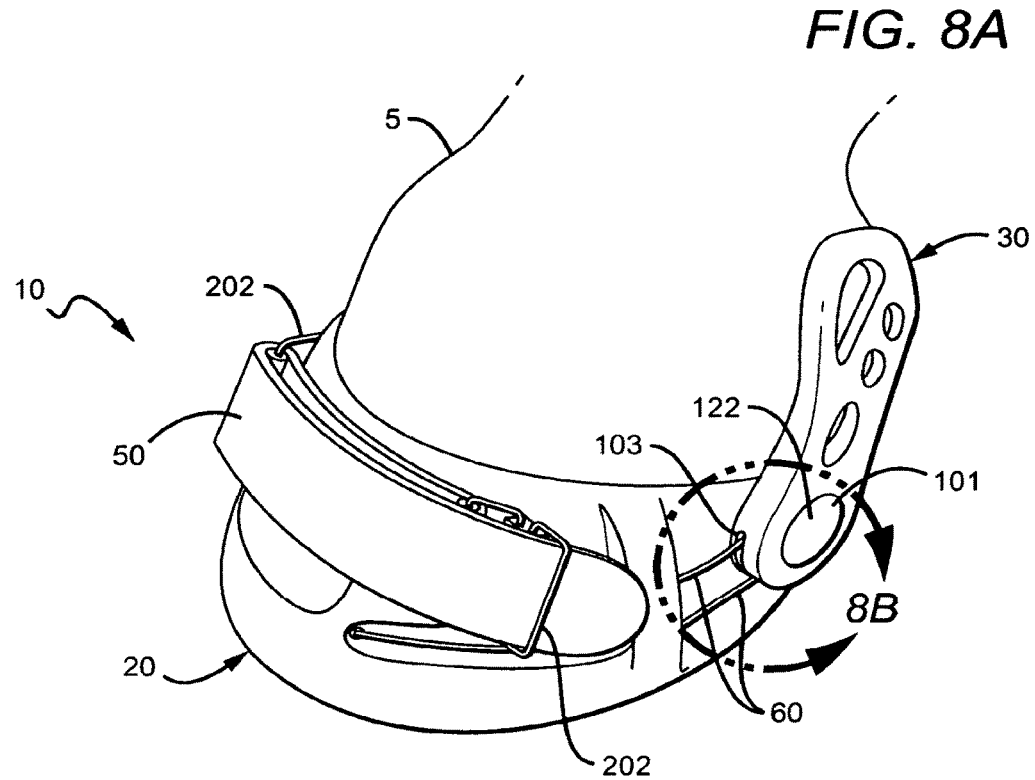
FIG. 8A is a front side view of an alternative implementation of a hoof boot, fitted to a model of a hoof.
Figure 8B:
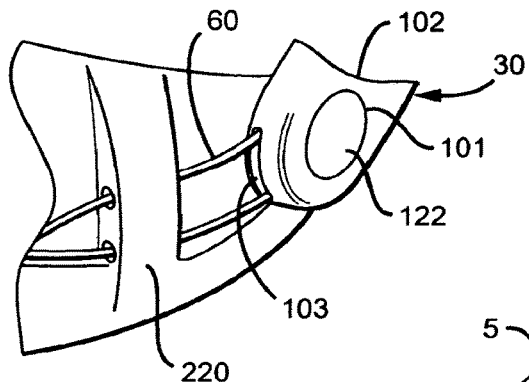
FIG. 8B is a close up view of a portion of the hoof boot of FIG. 8A.

In FIG. 8B, there are attachment positions 101 on both sides of the heel captivator 30. Conforming to the open design, the attachment positions 101 are preferably of a circular shape, and have a slot 103 on the side 102 of the heel captivator 30 where a cable pulley is inserted. This allows cables 60 to go through via the slot 103.

Figure 13:
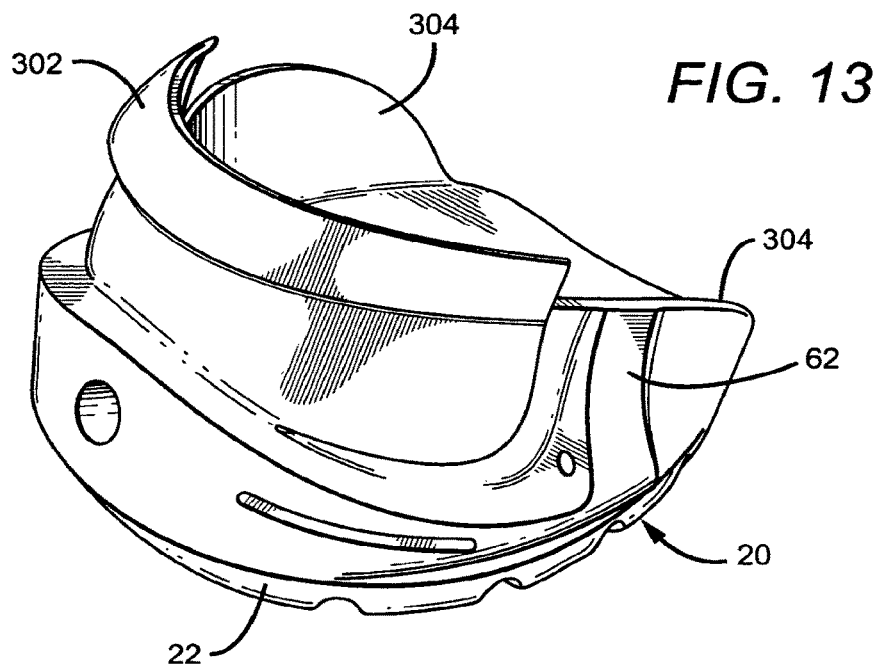
FIG. 13 is a rear side view of another alternative hoof boot.
Figure 14:
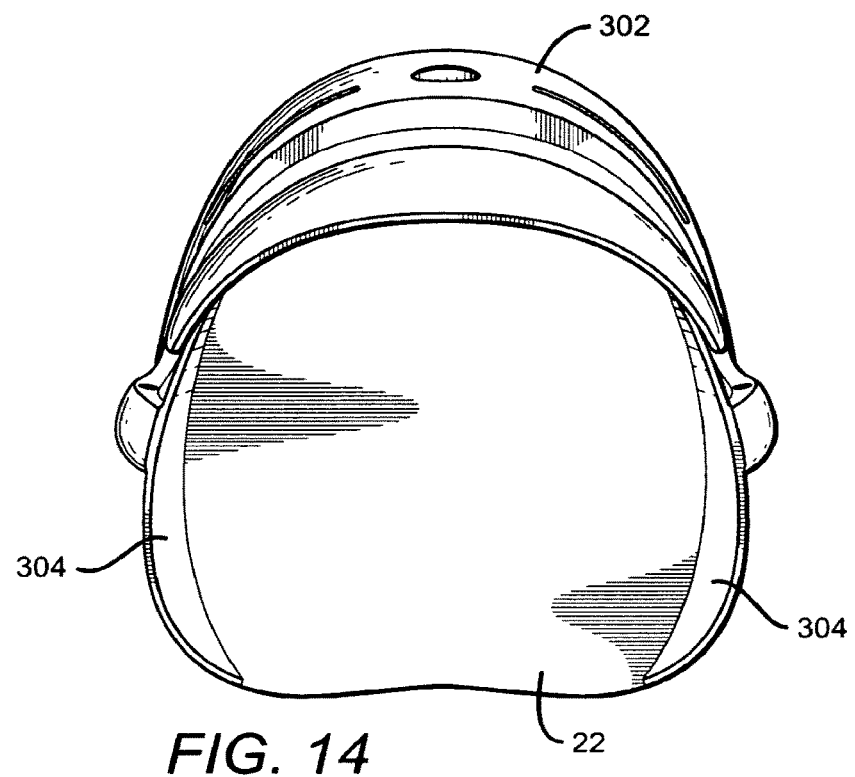
FIG. 14 is a top view of the hoof boot of FIG. 13.

In FIGS. 13 and 14, the base 20 of the boot comprises two sides 304, a front flap 302 and a bottom 22.

The sides 304 are conformed to the shape of the hoof and extend from the back of the boot and continues in a curved fashion on both edges of the boot to form a slope and round shape. On each outer surface of the edge, there is a cable guide 62. The cable guides 62 are protruded portions that comprise at least one hole on one side and two holes on the other to allow for the cables 60 to extend from the front to the heel captivator.

In preferred embodiments, the front flap 302 extends from the bottom 22 and covers the sides 304. To prevent damaging the soft tissues, the front flap 302 takes into consideration the hooves' structure. It is contemplated that the front flap 302 does not cover the top portion of the hoof wall. More preferable the front flap 302 sits below the horn juncture. The low design prevents the trapping of debris against the delicate soft tissues. Prior art stops at or near the soft tissue to horn juncture where the tough hoof wall horn is not fully developed. Having a higher frontal region also subjects the hoof to damages. Old boot shell can rise well above the horn juncture where it can trap debris against the soft tissue, causing bruising, chaffing and abrasions, especially when debris is trapped between the hoof and the boot.

One preferred embodiment has the front flap 302 acting like a tongue enclosed with overlapping sides. It is contemplated that the front flap is no higher than 10 cm, and preferably 9 cm. The lower design of the front flap allows for variances in hoof wall angle which permits the boot to conform well with the hoof wall. Hoof wall angles vary from hoof to hoof and from horse to horse. The thickness of the front flap is preferably no more than 1 cm. The minimal thickness in the toe region is desirable as it reduces the possibility of damage to the horse's hoof. The overlapping features of the front flap 302 to the sides forms a tight closure that serves to seal out debris. This overlapping front flap contrasts to the prior art which includes V cut interface between the adjustable portion and the front region or a bifurcated folding flap, which is generally loose and does not seal well.

The base of the boot can be constructed with any suitable material. Preferred embodiments include a flexible, tough, resilient and elastic material that would permit normal expansion and contraction of the hoof and at the same time allowing the blood in the hoof to circulate and to absorb shock. It is contemplate that the material of the base should not appreciably hinder the hoof's natural movements, such as lateral vertical displacement as the hoof contacts on various terrains. It is important to prevent the bones, joints, ligaments, tendons and other connective tissues in the foot and lower leg of the horse from being overloaded. It is also contemplated that the base can be of a variety of colors and owners can decorate the base with different features, such as glitters and rhinestones.

Currently preferred embodiments include a one-piece molding from a polymeric substance or elastomeric material of 40 shores D hardness. It is contemplated that other materials are possible. Materials such as urethane, rubber or other elastomeric material, or a singular or composite of materials such as urethane, leather, rubber, vinyl, plastic, flexible plastic sheet, sponge neoprene sheet, heavy fabric or canvas, various cords, straps and or other textile materials can be used.

Figure 18:
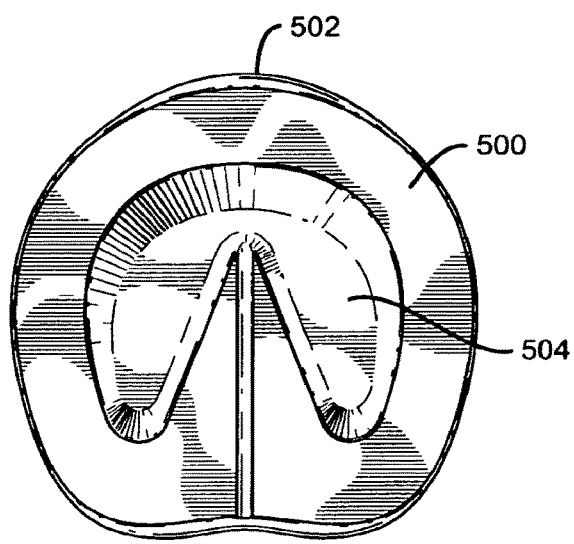
FIG. 18 is a bottom view of a sole of a hoof boot.

The sole 500 as shown in FIG. 18 preferably is a shape similar to that of a horse's bare hoof. In preferred embodiments, the sole 500 features a prominent outer rim 502 and a frog pressure zone 504 tapered away from the ground towards the center of the boot. Frog pressure is especially important for preserving proper hoof expansion and contraction during loading and unloading. The shape allows the boot to preserve the natural ground pressure and traction capabilities of the bare hoof while wearing the boot.

Figure 11:
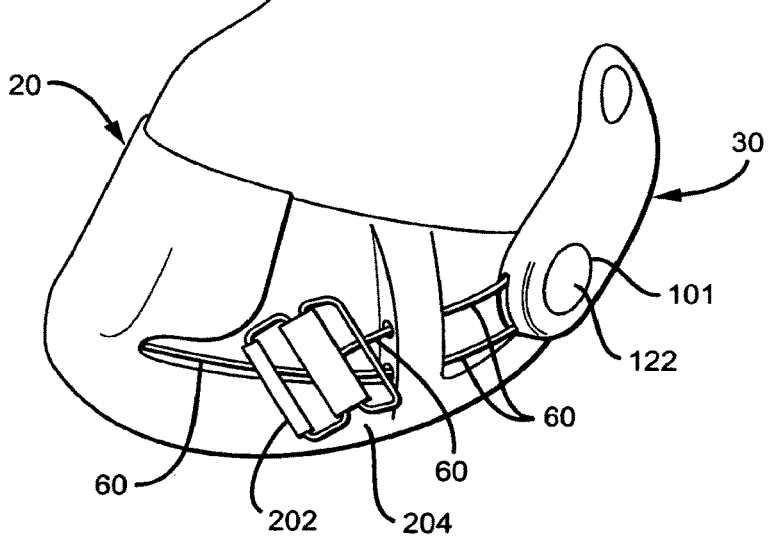
FIG. 11 is a front side view of the front base of another alternative hoof boot, showing a tensioning buckle.
Figure 19:
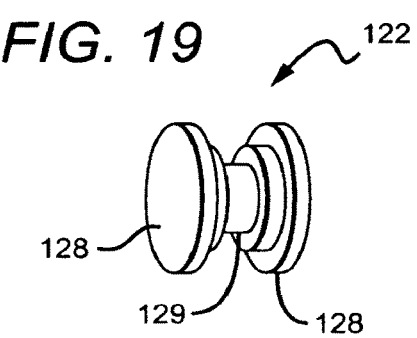
FIG. 19 is a front view of a cable pulley knob of a hoof boot.

In preferred embodiments, the heel captivator 30 is attached to the base at attachment positions 101 depicted in FIGS. 1, 2, 4, 5, 9, 11, and 12 in a pivoting motion. The pivoting motion includes use of sloppy pivots that have more than a rotational freedom of movement and allows the heel captivator movement in all directions. In FIGS. 11 and 19 the cable pulley block 122 comprises two end pieces 128, and connector 129 about which the cable is disposed. As shown in FIGS. 8B and 11, the cables 60 go through the cable guides 62 to the front of the base 20 and allow the heel captivator to have elasticity upon wearing. Preferably, the cables 60 extend through the cable guides 62 to the front of the base, crossing over to the opposing side. The mechanically advantaged cable lacing pathway reduces the tension forces required of the cable tension mechanism, by virtue of the cables passing through and around the cable pulley. Use of a mechanically advantaged pathway also serves to reduce the effort required of the user in tensioning the lacing system, thereby eliminating the need for geared or similar systems.

The cable pulley block 122 is preferably designed flush with generally contour of the heel captivator. Cable pulley block 122 can be made of any suitable material, including plastics. Other types and modes of attachments can alternatively or additionally be used.

Preferably, cables 60 are made of stainless steel, but other types of resilient, flexible and durable wires are contemplated. In preferred embodiments, the diameter of the wires are no large than 1 cm.

The cable tension mechanism, also known as the coupling system, provides sufficient freestanding up/down and forward/backward displacement of the heel captivator of at least 0.5 cm, preferably 1.0 cm and most preferably 1.2 cm.

In an especially preferred embodiment, the cable originates from the cable tension mechanism at or near the upper portion of the tongue, passes rearward through the lateral cable guides, around the cable pulley block located on the forward distal ends of the heel captivator, then forward through the lateral cable guide, and further onto the toe cable guide, crossing over to the opposing side and ditto for the other side. This pathway serves to reduce the tension forces required of the cable tension mechanism by virtue of the cable passing through and around the cable pulley block. The use of pulley systems to increase mechanical advantage is well understood and its employment here serves to reduce the force required of the end user to tension and secure the lacing cables, whether the boot is deployed with a ratcheting cable spool/drum, or a hook and loop fastener strap, or some other means of tensioning and securing the laces. The use of a mechanically advantaged tensioning system is also advantageous because it mitigates a disadvantageous loosening which would tend to occur in a direct tensioning system.

FIG. 4 shows the perspective view of the cable tension mechanism in action. It shows how the heel captivator can pivot freely along with the hoof during extreme movement by allowing the heel captivator to not only restrain the hoof within the boot but provide enough lateral and up and down movements for the hoof to move freely. The cables increase in tension in unison with the upward movement of the hoof which in turn increases holding pressure of the heel captivator, further minimizing the possibility of the hoof inadvertently separating from the boot during use.

The heel captivator 30 can be attached to a boot base by any suitable means, including for example: adjustable cables, cords, straps or other similar structures. Preferred attachment means emanate only from the forward lateral distal ends of the heel captivator, and then pivots to the lateral region of the boot base with no other direct attachments thereunto. This method of attachment permits the heel captivator to move freely along with the hoof as the hoof moves about in relationship to the boot during use which enables the heel captivator to retain maximum and intimate contact with the hoof enabling maximum effectiveness in retaining the boot upon the hoof.

As shown in FIG. 5, a preferred heel captivator can be loose and free to move, flex and adjust upwardly which allows the heel captivator to conform to various heel heights of the hoof which can vary from hoof to hoof and from animal to animal. This is in contrast to prior art designs which have the heel captivator attached to the rearmost portion of the boot that requires a constant adjustment of the boot. Many fittings are also required to find the appropriate size for the hooves. It is contemplated that heel captivators can be designed to require no adjustment or fitting whatsoever, and instead automatically adjust to varying heel heights when installed upon the hoof for use. Additional benefit to this automatic adjustability is the fact that hoof can vary in its heel height from day to day, week to week and month to month making boots that require adjustment or changing of parts inconvenient to use as the heel height adjustment needs to be addressed to conform to the potentially frequent variability of any particular hoof.

Figure 9:
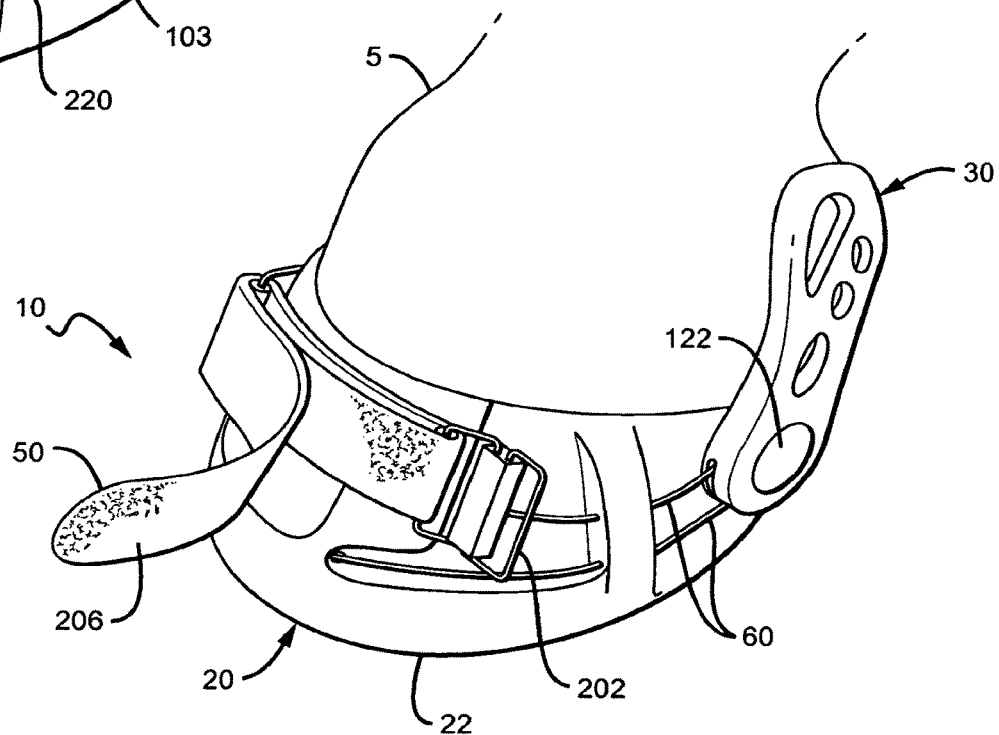
FIG. 9 is a front side view of the hoof boot of FIG. 8A, showing the strap open.

On the front of the boot base, a hook strap and loop fastener is employed to house the cable tension mechanism. FIGS. 8A and 9 show a hook strap 50 on the base 20 with buckle adapter 202 on either side.

Figure 10:
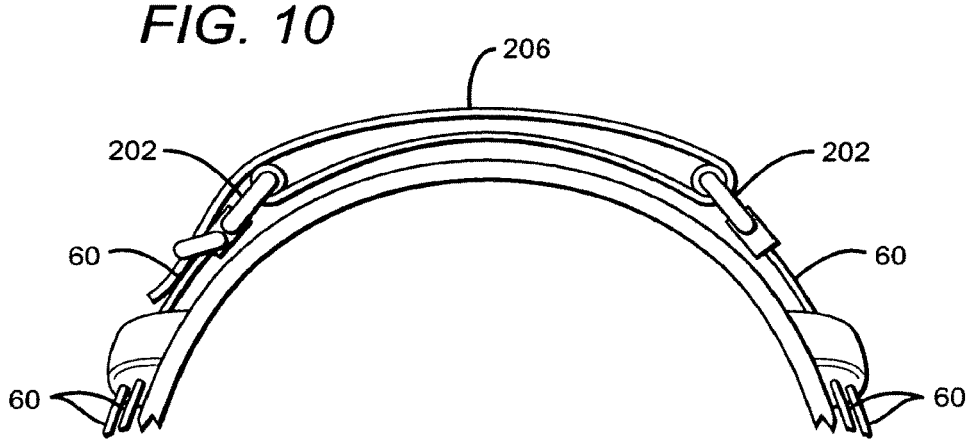
FIG. 10 is a top view of the front base of the hoof boot of FIG. 8A.

In preferred embodiments, the hook strap 50 is one continuous material 206 that folds into two layers as shown in FIGS. 10 and 11. The hook strap first wraps around the buckle adapter 202 on both sides for a secured connection, and then the hook strap goes through the outer portion of the buckle adapter and straps across the bottom layer. The inner surface of the layers comprises an adhesive material, preferably a Velcro® or other hook and loop material that allows the two layers to fasten to each other and form a tight connection. This mechanism is similar to the cable tension mechanism in that the hook strap allows for elasticity and adjustment without causing damage to the boot and hoof.

The hook strap is made of any suitable strap materials that are resilient, durable and easy to use. Preferred materials include plastics with an adhesive portion, or a hook and loop arrangement that allows attachment to attach itself.

Figure 12:
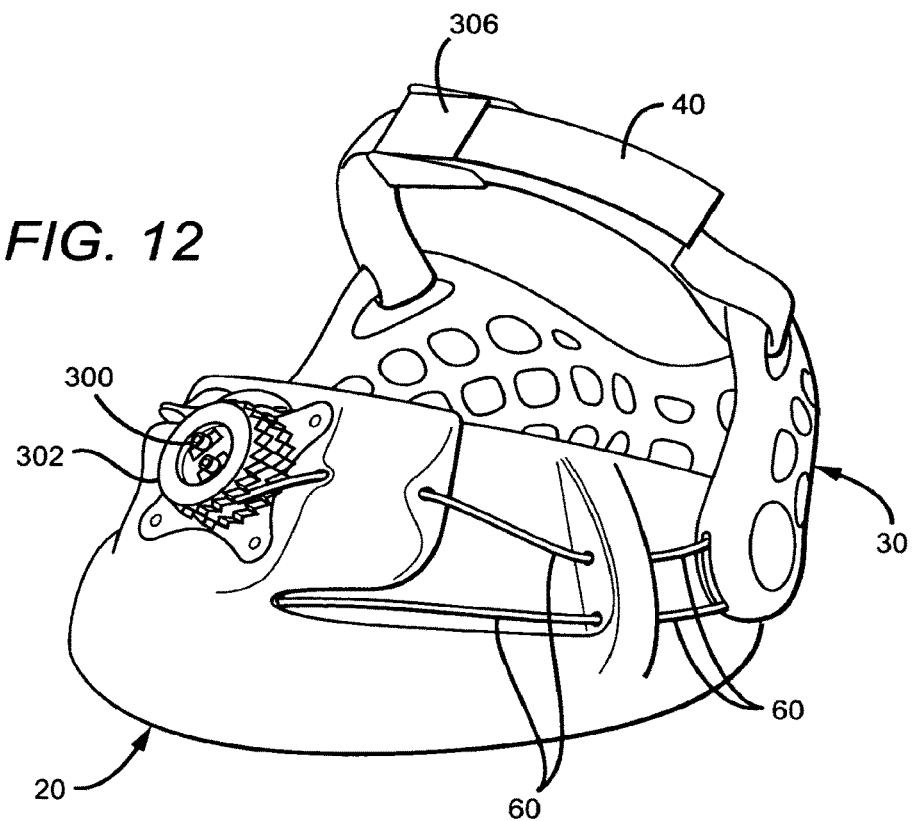
FIG. 12 is a front side view of the front base of another alternative hoof boot, showing a tensioning dial.

An alternative embodiment of the front tension mechanism is shown in FIG. 12. Instead of a hook strap and buckle adapter system the embodiment employs the use of winding knob 300. The winding knob 300 works like a cable spool where the base plate engages the ratchet pawl 302 and rotates the winding knob clockwise until the desired tension is achieved. By moving the winding knob 300 in the opposite direction, the tension is released. This not only serves to release all of the cables from the winding knob, but also helps to eject dirt and debris from under and around the mechanism and makes cleaning easy with a simple brush.

The winding knob 300 uses a "pop up" action to release and wind the cables 60. The mechanism could be closed, but is preferably an open system that continues to function in the presence of dirt and debris.

In preferred embodiments, a keeper strap 40 couples to heel captivator 30 through strap positions 104. The keeper strap 40 keeps the pastern bone intact which enhances boot retention during use, especially in extreme conditions, such as galloping in deep water, snow or mud. Preferably, the keeper strap is made of nylon or other suitable materials that can be adjusted and released by means of cam lock buckle 306 or a hook and loop fastener.

Figure 15:
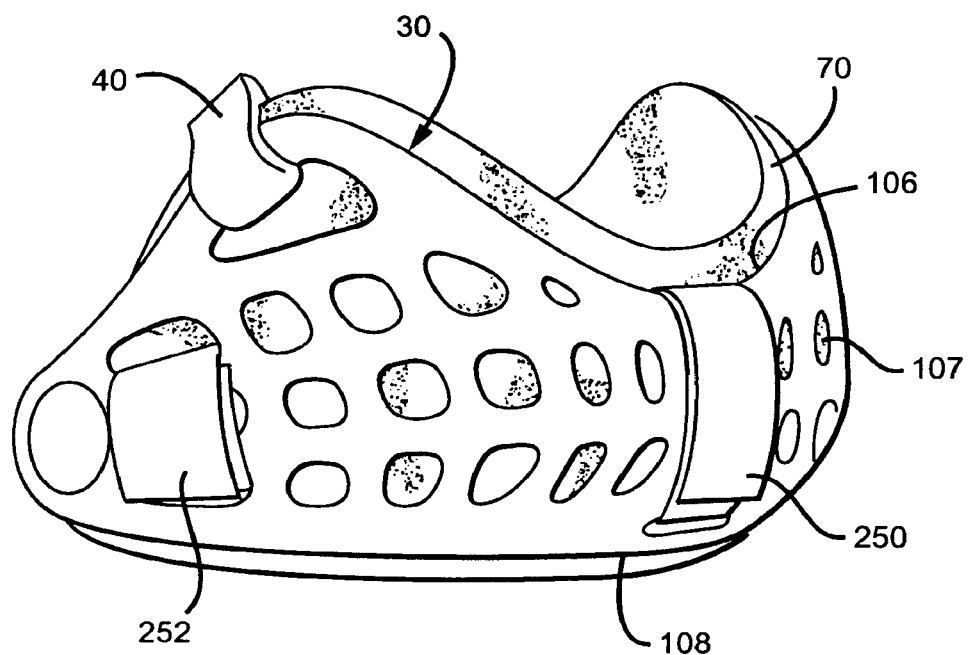
FIG. 15 is a back side view of a heel captivator.
Figure 16:
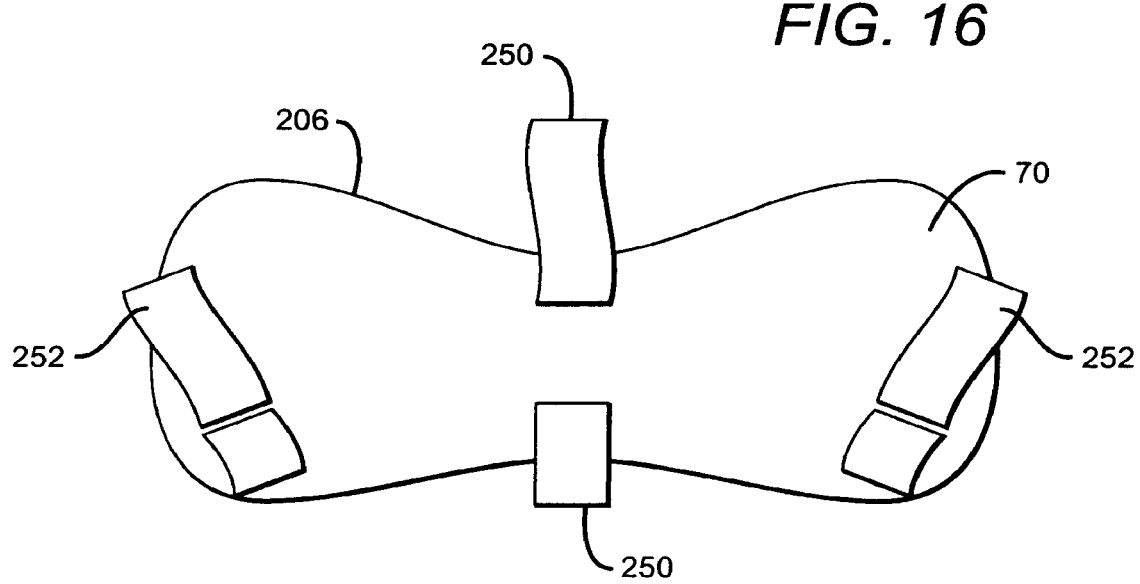
FIG. 16 is a perspective view of a hoof boot liner.

In yet another preferred embodiment, an optional liner 70 as shown in FIGS. 15 and 16 can be inserted in the heel captivator for added cushion. Preferably neoprene is used, but other suitable material and fabric that are comfortable and form-fitting are contemplated, including visco-elastic foams. The liner 70 has a middle strap 250 and two side straps 252 that can be secured through the holes of the heel captivator 30. The straps can use Velcro® or other suitable fastener means to attach to the heel captivator. The liner provides comfort to the hoof without causing chafing and abrasion to the region. It can be quickly and easily installed or removed with the strap or hook and loop fastener.

In yet a further preferred embodiment, the liner 70 has holes that correspond with the open mesh of the heel captivator to release debris that is trapped in between the boot and the hoof. Various sizes are contemplated for the liner. Depending on the size, the liner can be wrapped across the front, lateral, all other directions of the pastern bone. Different shapes are also contemplated, including a full height liner shown in FIG. 17. The keeper strap 40 can keep the liner intact over the pastern bone region of the hoof.

Figure 20:
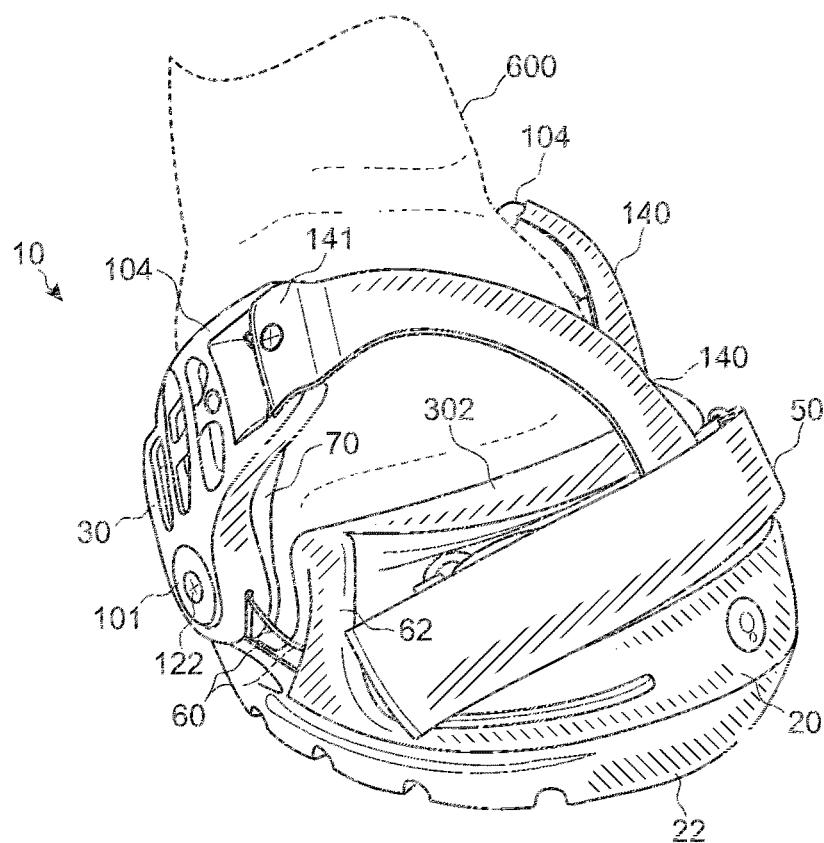
FIG. 20 is a side perspective view of a hoof boot with a pair of inertia straps coupled to the heel captivator and the base, fitted to a model of a hoof.
Figure 21:
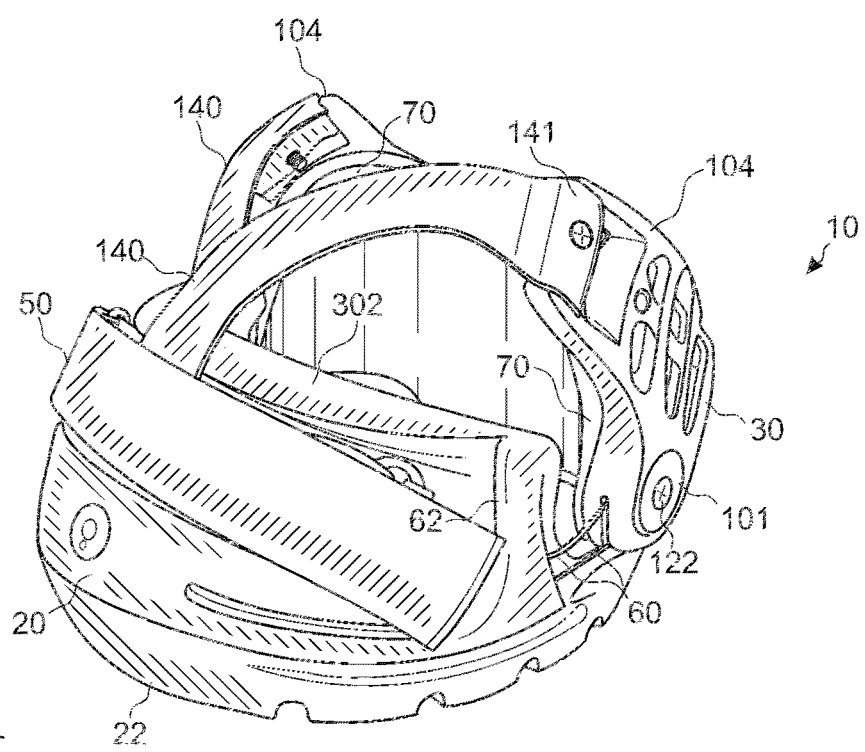
FIG. 21 is an opposite side perspective view of the hoof boot of FIG. 20, with no model of a hoof.

In an improved embodiment shown in FIG. 20, the hoof boot 10 comprises a base 20 including a bottom 22, a heel captivator 30, at least one inertia strap 140, a hook strap 50 with cables 60, and a liner 70.

Figure 26:
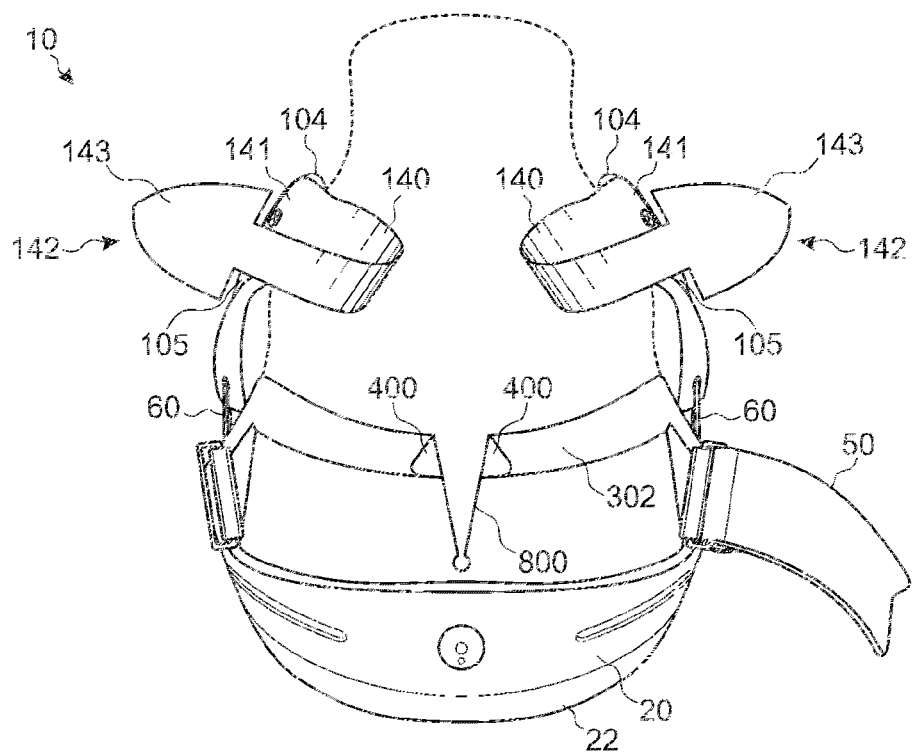
FIG. 26 is a front view of the hoof boot of FIG. 20 with the pair of straps removed from the base and a notch shown on the base of the boot, fitted to a model of a hoof.
Figure 27:
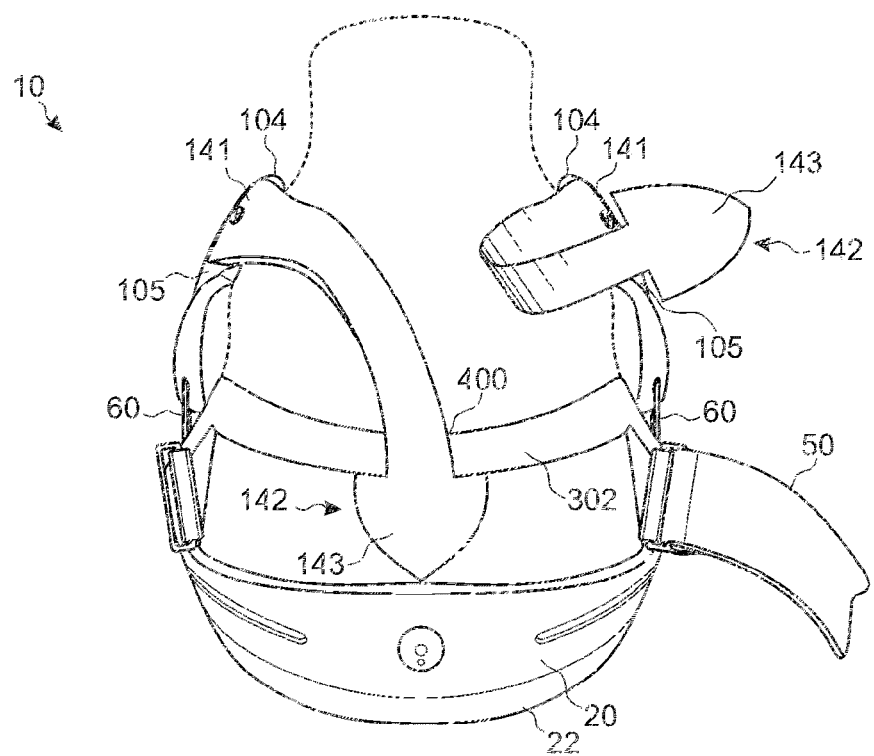
FIG. 27 is a front view of the hoof boot of FIG. 20 with one strap attached to the heel captivator and the base and the other strap open and attached to the heel captivator, fitted to a model of a hoof.
Figure 28:
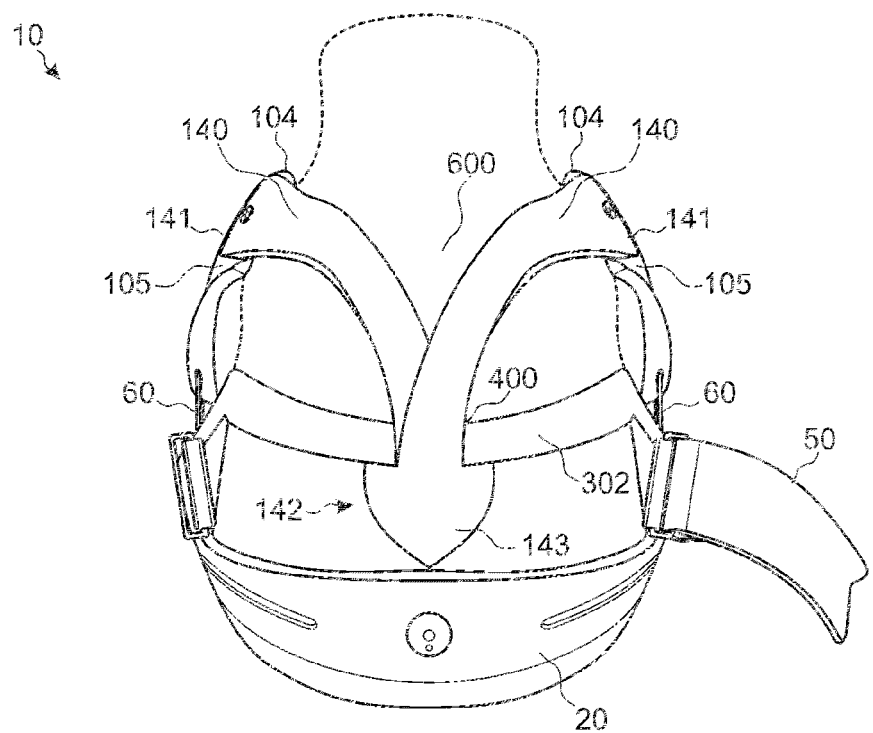
FIG. 28 is a front view of the hoof boot of FIG. 20 with both straps coupled to the heel captivator and the front of the base with the hook strap open, fitted to a model of a hoof.
Figure 29:
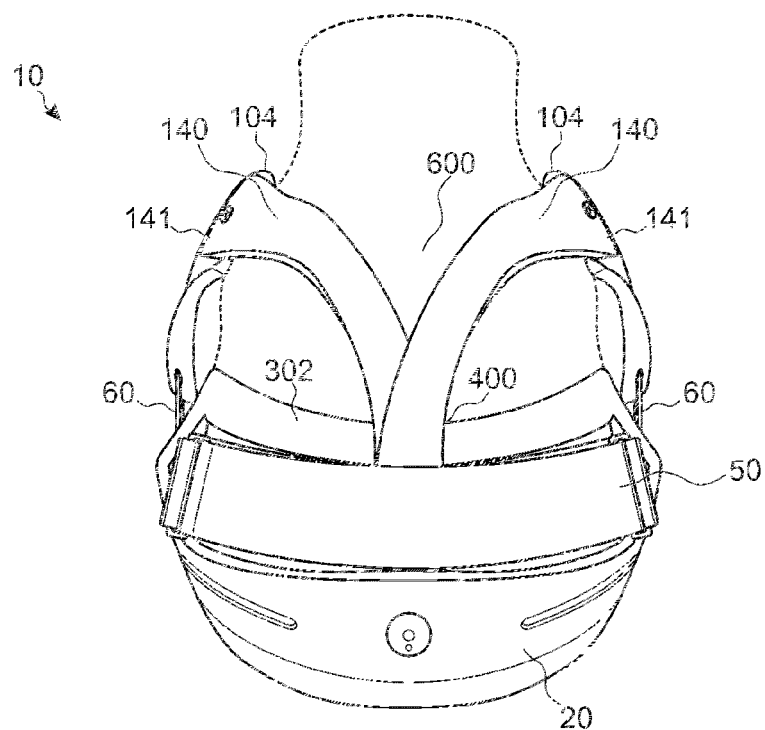
FIG. 29 is a front view of the hoof boot of FIG. 20 with both straps coupled to the heel captivator and the front of the base with the hook strap closed, fitted to a model of a hoof.

As shown in FIGS. 26, 27, and 28, it is preferred that the embodiment include a pair of inertia straps 140, wherein each of the inertia straps 140 has two ends 141 and 142. The first end 141 of the inertia strap 140 includes an adjustable portion that attaches to the strap holder portion 104 which is forward of the heel bulb 105 of the heel captivator 30. In the embodiment of the invention shown in the figures, the second end 142 of the inertia strap 140 includes a tab 143 that couples at an inertia strap attachment point 400 at the front of the base 20. As seen in the embodiment of FIGS. 26, 27, and 28, the inertia strap attachment point 400 on the base 20 of the boot 10 is a notch. In other embodiments, the inertia strap attachment point 400 can be on the front flap 302 of the hoof boot 10 and may or may not include a notch. Some other types of attachment points 400 include, but are not limited to, hooks, abutments, eyelets, screws, latches, etc.

As seen in FIG. 26, there is a relief cut out 800 on the front of the base 20. This relief cut out 800 allows the front portion of the base 20 to move inward and outward so as to conform to various hoof wall angles. In the invention, the relief cut out 800 can be made of any shape such as a slit, a V shape, a square shape, etc. as long as the hoof boot 10 can move to accommodate various sizes of hooves. Moreover, there can be more than one relief cut out 800 on the hoof boot 10.

In the preferred embodiment of the invention, the pair of inertia straps 140 forms a V shape across the top frontal portion of the hoof of the horse 600. The inertia straps 140, however, can form any shape across the frontal portion of the hoof of the horse 600 that still allows the heel captivator 30 to move vertically relative to the base 20. For example, in another embodiment, the inertia straps 140 can come across the frontal portion of the horse hoof 600 in more of a side by side manner. As long as the inertia straps 140 couple the heel captivator 30 to the front of the base 20, cross the frontal portion of the hoof, and allow vertical movement of the heel captivator 30 relative to the base 20, the inertia straps 140 do not need to exactly form a V shape.

FIGS. 27 and 28 show the tabs 143 of the inertia straps 140 coupling to the inertia strap attachment point 400 on the base 20 of the hoof boot 10. The inertia straps 140 can be coupled to the front of the base 20 of the hoof boot 10 in a number of ways. In the preferred embodiment, shown in FIG. 27, the first inertia strap is coupled to the inertia strap attachment point 400 of the base 20 of the hoof boot 10. As can be seen, the tab 143 of the inertia strap 140 is coupled to the front flap 302. The front flap 302 provides a notch 800 where the tab 143 portion of the inertia strap 140 can securely attach to the front of the base 20 of the hoof boot 10. FIG. 28 shows the second inertia strap 140 also coupled to the inertia strap attachment point 400 of the base 20 of the hoof boot 10 and coupled to the front flap 302. In the preferred embodiment, the second inertia strap 140 is located directly on top of the first inertia strap 140. This, however, is not the only configuration of the inertia straps 140. In particular, the first inertia strap 140 could be placed directly on top of the second inertia strap 140. In the preferred embodiment shown, because of the shape of the tabs 143 on the inertia straps 140, they can be easily attached and removed from the front flap 302 yet still securely restrain the hoof in the hoof boot 10. The shape of the tab 143 on the inertia straps 140, however, could be of any shape that allows coupling to the inertia strap attachment point 400 on the front of the base 20 of the hoof boot 10. Preferably, the keeper strap 50 is then secured across the front of the base 20 and covers the second end 142 of the inertia straps 140 including the tabs 143 to keep them in place while the hoof boot 10 is on the hoof of the horse. Any other fastening means, however, could be used to secure the second ends 142 of the inertia straps 140 to the front of the base 20.

In alternate embodiments, the inertia straps 140 can be removably coupled to the front of the base 20 of the hoof boot 10 in various ways. Some of these means of coupling include hooks and notches of various shapes, hooks and eyes, snaps, latches, screws, and the like.

Moreover, the inertia straps 140 could consist of one strap. In one embodiment that includes one inertia strap 140, the inertia strap 140 is integrally molded to the front of the base 20 of the hoof boot 10 and removably coupled via each first end 141 to the strap holder portion 104 of the heel captivator 30. This allows the hoof to be placed in the boot 10 and secured for use. In another alternate embodiment, the one inertia strap 140 could releasably couple to one strap holder portion 104 of the heel captivator 30 and the front of the base 20. The other end could be adjustably coupled to the opposite strap holder portion 104 of the heel captivator 30.

The first end 141 of each of the inertia straps 140 connected to the holder portion 104 of the heel captivator 30 is adjustable. The adjustability of the inertia straps 140 allows the hoof boot 10 to be properly sized to accommodate many different sizes of hooves. The adjustability is achieved by allowing the user to change the length of the inertia strap 140 prior to securing it to the holder portion 104 of the heel captivator 30. The inertia strap 140 can be secured with an adjustable screw, hook and loop fastener, or any other type of fastener that allows the user to adjust the length of the inertia strap 140.

This embodiment with the pair of inertia straps 140 allows the forces of inertia acting upon the heel captivator 30 to be counteracted. The forces of inertia acting upon the heel captivator 30 are transferred through the inertia straps 140 to the top portion of the inertia strap attachment point 400 on the front of the base 20 of the boot 10 and are not transmitted to the pastern bones of the hoof. This relieves the potential interference of the pastern bones that can inhibit movement of the bones.

Also, during fast gaits of the horse, as the hoof snaps off the ground, the ground plane portion of the sole and heel of the hoof lifts slightly off the bottom 22 of the hoof boot 10 while simultaneously the upper portion of the hoof wall in the toe region rotates forward increasing its angle in the direction of vertical by several degrees. This angular change of the hoof wall at the toe acts upon the inertia strap attachment point, causing it to move forward slightly which in turn pulls additional force upon the inertia straps 140. This further increases the effectiveness of the inertia straps 140 to counteract forces of inertia acting to further increase hoof boot 10 performance at faster speeds.

Additionally, the inertia straps 140 are always ready for movement of the horse hoof in the boot 10 regardless of the position of the pastern bone at the time of the strike or terrain interference. This allows for more consistent boot 10 performance.

Figure 22:
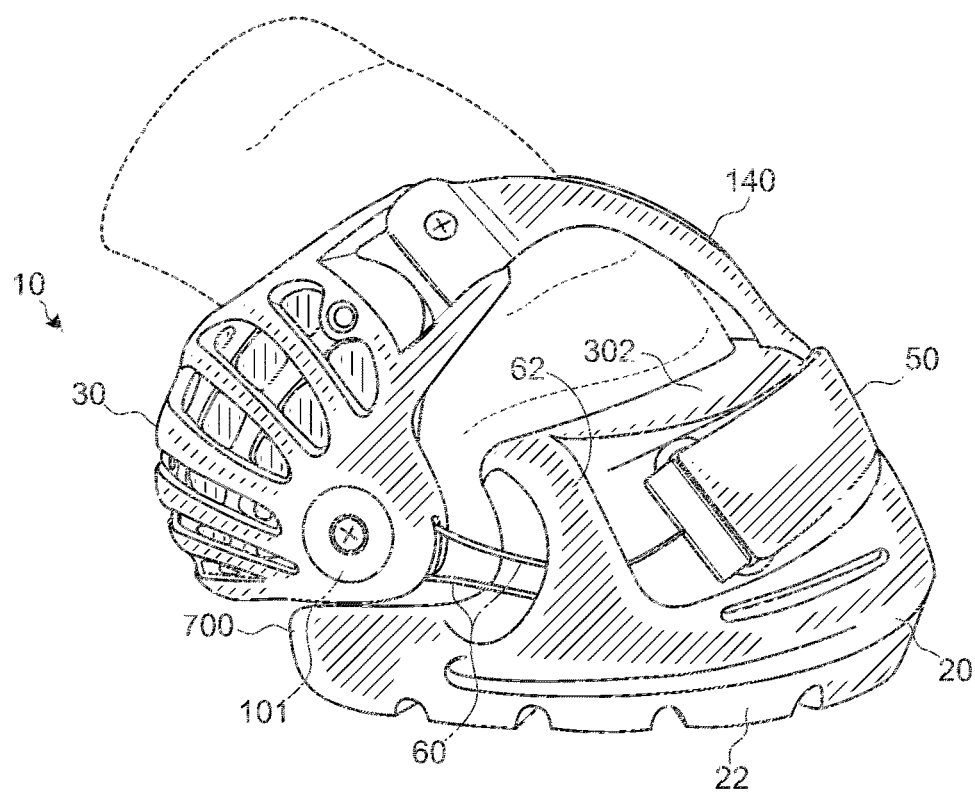
FIG. 22 is a side view of the hoof boot of FIG. 20, fitted to a model of a hoof.
Figure 23:
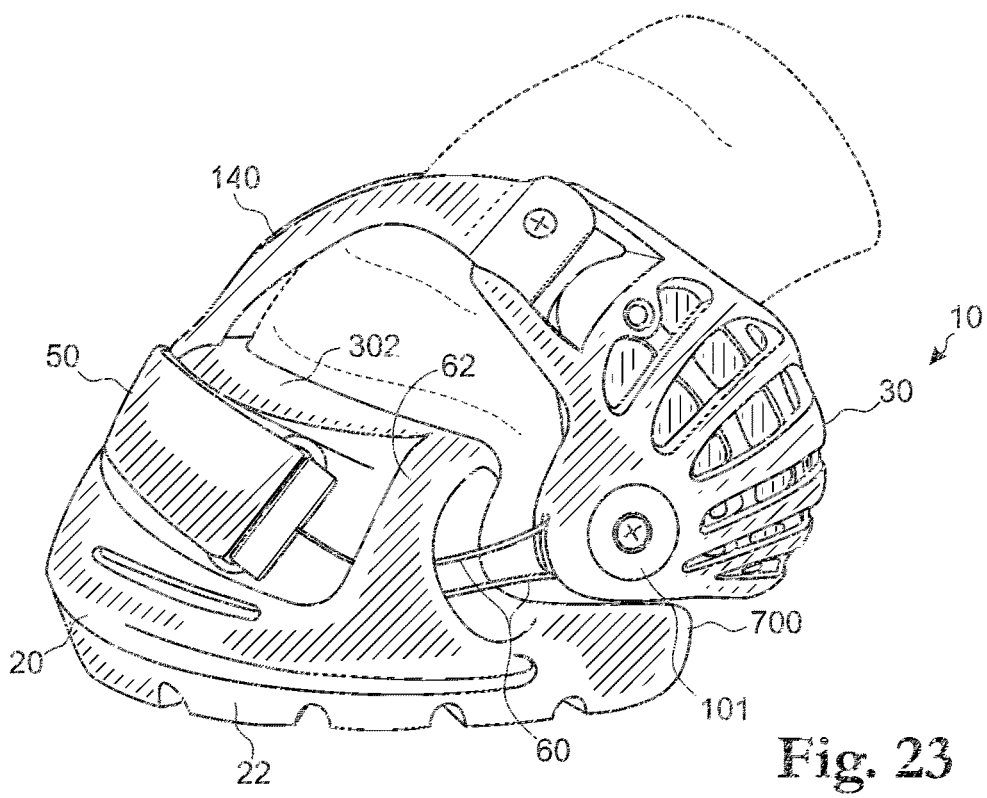
FIG. 23 is an opposite side view of the hoof boot of FIG. 20, fitted to a model of a hoof.
Figure 24:
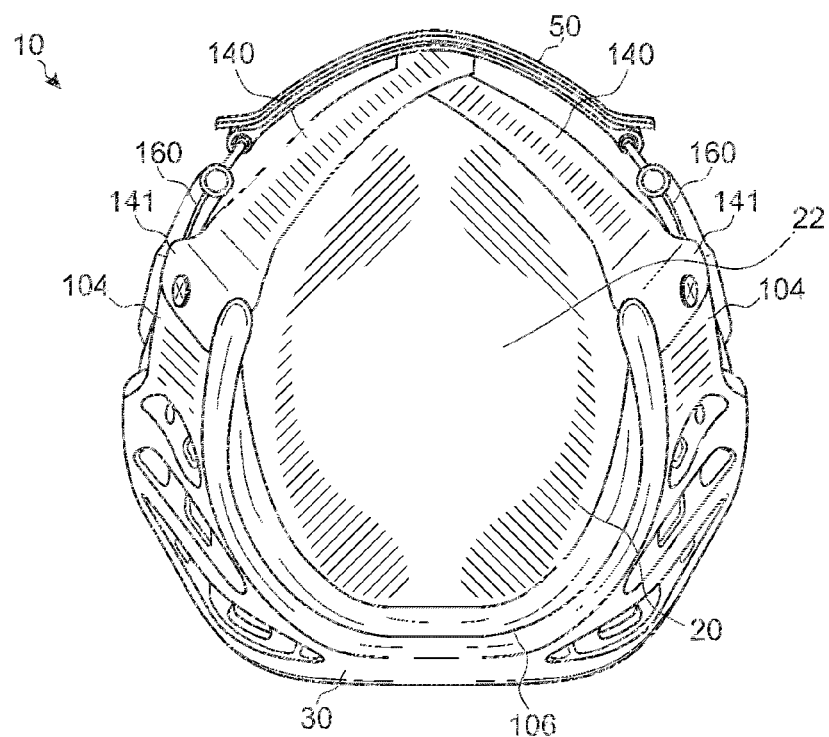
FIG. 24 is a top view of the hoof boot of FIG. 20, with no model of a hoof.
Figure 25:
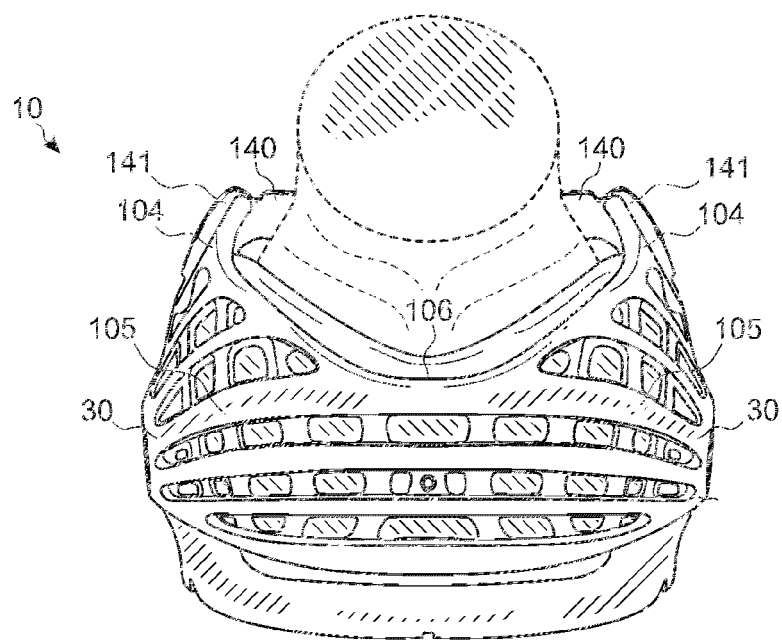
FIG. 25 is a rear view of the hoof boot of FIG. 20, fitted to a model of a hoof.

Further, as seen in FIGS. 22 and 23, the portion of the base 20 underlying the heel captivator 30 is eliminated. This portion is replaced with a low profile and thicker section 700 that is more in the configuration of a curb. The result of this configuration is the reduction of the possibility for gaps to be exhibited between the hoof walls and upper as with the prior art. The heel captivator 30 is now allowed to fully contact the heel bulbs of the hoof in the most intimate manner possible. This provides much greater stability of the boot 10 relative to the hoof than in the prior art design.

Thus, specific embodiments and applications of the boot have been disclosed. It should be apparent, however, to those skilled in the art, that many more modifications besides those already described are possible without departing from the inventive concepts herein. The inventive subject matter, therefore, is not to be restricted expect in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refer to at least one of something selected from the group consisting of A, B, C . . . and N, the text should be interpreted as requiring only one element from the group, no A plus N, or B plus N, etc.

What is claimed is:

1. A hoof boot for use on a hoof, the hoof boot comprising:
a base including a sole and a front that at least partially covers lateral and anterior surfaces of the hoof;
a heel captivator;
a coupling mechanism for coupling the base to the heel captivator and allowing vertical movement of the heel captivator relative to the base after coupling;
a pair of inertia straps that couples the heel captivator to the front of the base wherein each strap has a first end and a second end wherein the first end is adjustably coupled to the heel captivator and the second end is removably coupled to the front of the base.

2. The hoof boot of claim 1 wherein the pair of straps are coupled to the front of the base at a notch.

3. The hoof boot of claim 1 wherein the pair of strap form a V shape across a top frontal portion of the hoof.

4. A hoof boot for use on a hoof, the hoof boot comprising:
a base including a sole and a front that at least partially covers lateral and anterior surfaces of the hoof;
a heel captivator;
a coupling mechanism for coupling the base to the heel captivator and allowing vertical movement of the heel captivator relative to the base after coupling;
a pair of inertia straps that couples the heel captivator to the front of the base wherein the heel captivator includes a pair of strap holder portions and wherein the pair of straps are adjustably coupled to the heel captivator at the strap holder portions.

5. The hoof boot of claim 4 wherein the heel captivator includes a contour and wherein the strap holder portions extend to front of the contour.

6. The hoof boot of claim 5 wherein the contour of the heel captivator is a heel bulb portion and wherein the strap holder portions extend in front of the heel bulb portion.

* * * * *